(12) United States Patent
Schneider et al.

(10) Patent No.: US 12,086,928 B2
(45) Date of Patent: Sep. 10, 2024

(54) METHOD FOR CREATING A GRAPHIC REPRESENTATION OF A DENTAL CONDITION

(71) Applicant: DENTSPLY SIRONA INC., York, PA (US)

(72) Inventors: Sascha Schneider, Mühlta (DE); Evgenij Derzapf, Lorsch (DE); Frank Seibert, Darmstadt (DE)

(73) Assignee: DENTSPLY SIRONA INC., York, PA (US)

(*) Notice: Subject to any disclaimer, the term of this patent is extended or adjusted under 35 U.S.C. 154(b) by 0 days.

(21) Appl. No.: 17/312,190

(22) PCT Filed: Dec. 2, 2019

(86) PCT No.: PCT/EP2019/083317
§ 371 (c)(1),
(2) Date: Jun. 9, 2021

(87) PCT Pub. No.: WO2020/120199
PCT Pub. Date: Jun. 18, 2020

(65) Prior Publication Data
US 2022/0020207 A1  Jan. 20, 2022

(30) Foreign Application Priority Data

Dec. 11, 2018 (EP) .................................... 18211695

(51) Int. Cl.
*G06T 17/00* (2006.01)
(52) U.S. Cl.
CPC .......... *G06T 17/00* (2013.01); *G06T 2210/41* (2013.01)

(58) Field of Classification Search
None
See application file for complete search history.

(56) References Cited

U.S. PATENT DOCUMENTS 5,562,448 A    10/1996  Mushabac
5,734,384 A *   3/1998  Yanof ..................... G06T 17/10
                                                                345/419

(Continued)

FOREIGN PATENT DOCUMENTS

CN    106806030 A    6/2017
CN    108209915 A    6/2018

(Continued)

OTHER PUBLICATIONS

Sandro Barone, Alessandro Paoli, Armando Viviano Razionale, "Creation of 3D Multi-Body Orthodontic Models by Using Independent Imaging Sensors", Feb. 5, 2013, MDPI, Sensors, vol. 13, Issue 2.*

(Continued)

*Primary Examiner* — Robert Bader
(74) *Attorney, Agent, or Firm* — DENTSPLY SIRONA INC.

(57) ABSTRACT

The invention relates to a method for constructing a dental component (I) using a graphic representation of a dental condition. A 3D volume model of the dental condition is thus already correlated with a 3D surface model of the dental condition, wherein the graphic representation of the 3D volume model is restricted to relevant regions by delimitation using the 3D surface model or using a section thereof, wherein the remaining regions of the 3D volume model are hidden.

6 Claims, 4 Drawing Sheets

(56) References Cited

U.S. PATENT DOCUMENTS

| | | | |
|---|---|---|---|
| 2004/0249303 A1* | 12/2004 | Serra | G06F 3/04812 600/545 |
| 2005/0070782 A1 | 3/2005 | Brodkin | |
| 2011/0104630 A1* | 5/2011 | Matov | A61C 9/004 703/1 |
| 2012/0143364 A1 | 6/2012 | Macleod | |
| 2012/0239364 A1* | 9/2012 | Glor | A61C 13/0004 703/11 |
| 2013/0022255 A1* | 1/2013 | Chen | G06T 7/12 382/173 |
| 2013/0094740 A1 | 4/2013 | Vandenberghe | |
| 2015/0144898 A1 | 5/2015 | Dai | |
| 2021/0217222 A1* | 7/2021 | Kjær-Nielsen | A61B 6/466 |

FOREIGN PATENT DOCUMENTS

| | | |
|---|---|---|
| CN | 111031961 A | 4/2020 |
| DE | 19952962 A1 | 5/2001 |
| JP | 2014503264 A | 2/2014 |
| JP | 2015144898 A | 8/2015 |
| JP | 6238330 B1 | 11/2017 |
| JP | 2020531190 A | 11/2020 |
| WO | 201904303 A1 | 1/2019 |

OTHER PUBLICATIONS

Sharad Sahai, "Recent advances in imaging technologies in implant dentistry", 2015, Wolters Kluwer—Medknow, Journal of the International Clinical Dental Research Organization.*
International Search Report; PCT/EP2019/083317; Jan. 28, 2020 (completed); Feb. 7, 2020 (mailed).
Written Opinion of the International Searching Authority; PCT/EP2019/083317; Jan. 28, 2020 (completed); Feb. 7, 2020 (mailed).
International Preliminary Report on Patentability; PCT/ EP2019/083317; Jan. 28, 2020 (completed); Feb. 7, 2020 (mailed).
Chinese Office Action dated Mar. 14, 2022.
International Search Report; PCT/EP2018/073195; Nov. 7, 2018 (completed); Nov. 15, 2018 (mailed).

* cited by examiner

METHOD FOR CREATING A GRAPHIC REPRESENTATION OF A DENTAL CONDITION

CROSS-REFERENCE TO RELATED APPLICATIONS

This is a National Phase application of International Application No. PCT/EP2019/083317, filed Dec. 2, 2019, which claims the benefit of and priority to EP Application Ser. No. 18211695.4, filed on Dec. 11, 2018, which are herein incorporated by reference for all purposes.

TECHNICAL FIELD

The invention relates to a method for creating a graphic representation of a dental condition.

BACKGROUND OF THE INVENTION

Several methods for constructing tooth replacement parts are known from the state of the art.

DE 19952962 A1 discloses a method for constructing a drilling aid for a dental implant, wherein an x-ray image of the jaw is created and a three-dimensional optical recording of the visible surface is made, wherein the first 3D x-ray data set is correlated with the second 3D surface data set. With the aid of the superimposed data sets, the position of the implant relative to the adjacent teeth is planned and a drilling template is generated, which is fastened onto the adjacent teeth and thus enables the precise drilling of an implant hole.

U.S. Pat. No. 8,824,764 B2 discloses a method for recording dental objects, in which a segmentation of volume data is performed with specific segmentation parameters. These parameters are determined in advance using a calibration object.

EP 2010090 A1 discloses a method for producing tooth replacement parts, comprising an implant and a prosthetic to be fastened on the implant, in which a 3D x-ray model is correlated with an optical 3D surface data set. In the next step, a virtual 3D prosthetic model is displayed in the correct position in the correlated 3D x-ray model and positioned accordingly in relation to the jawbone.

EP 1547544 A1 discloses a method for constructing tooth replacement parts, in particular dental crowns, in which different three-dimensional data sets of the patient are combined and then implant-borne tooth replacement parts are constructed and a mechanical load is simulated.

WO 2006/031096 A1 discloses a method for constructing implant-borne tooth replacement parts, in which the position of the prosthetic relative to the jawbone is defined using a first data set, namely a CT scan. A second data set, namely an optical 3D image of a plaster impression, is then correlated with the CT scan.

A disadvantage of these known methods lies in the fact that during the construction of the tooth replacement part, the user must navigate within the CT volume data or within the optical surface data in order to find the relevant regions for the construction.

The object of the present invention is therefore that of providing a method for creating a graphic representation of a dental condition that enables a simple and clear construction of a tooth replacement part or easy navigation within the graphic representation.

SUMMARY OF THE INVENTION

The invention relates to a method for creating a graphic representation of a dental condition, in which a 3D volume model of the dental condition is correlated with a 3D surface model of the dental condition, wherein the graphic representation of the 3D volume model is restricted to relevant regions by delimitation using the 3D surface model or using a section thereof, wherein the remaining regions of the 3D volume model are hidden.

The graphic representation of the dental condition can be used, for example, for constructing a dental component such as a restoration or a drilling template, for planning a dental treatment such as an implant planning, or for an orthodontic treatment planning.

The dental component can be a restoration, a drilling template or a guided occlusal splint or an aligner, which can be produced using, for example, a CAD/CAM process or using a 3D printer.

The restoration can be, for example, an inlay, a crown, a bridge, an abutment, a pontic or a veneer.

The dental drilling template can be any drilling template, such as a drilling template supported by the adjacent teeth for minimally invasive surgery, as well as a drilling template supported by the jawbone for so-called open flap surgery. In this process, the drilling template is thus supported by the rest of the adjacent teeth of the jaw in question or screwed tightly on the jawbone by means of screws.

The drilling template is used for guiding a drill in order to perform a planned implant drilling for inserting an implant, as calculated in an implant planning.

The 3D surface model of the dental condition can be created by, for example, measurement using a dental camera, wherein the 3D volume model of the dental situation can be created, for example, by measurement using an x-ray CT device or MRI device.

The 3D surface model can also be created by segmentation of individual anatomical structures within the 3D volume model, wherein a surface of at least one structure is segmented, for example by segmentation of at least one tooth root.

The dental camera can be any three-dimensional dental camera that is based on, for example, a fringe projection method or a confocal measurement method.

The dental condition can comprise the immediate surroundings of the restoration to be inserted or of the component to be inserted, or also a larger region around the restoration to be inserted or the component to be inserted. The measurement using the dental camera can be performed from different directions such as an occlusal direction, a lingual direction, a buccal direction, or a labial direction. The dental condition can comprise, for example, both jaws including articular joints, an entire lower jaw or upper jaw, or also a portion of a jaw.

The 3D volume model can be calculated from the images of an x-ray CT device and the 3D surface model can be calculated from the image data of the dental camera, for example by means of a computer. The graphic representation of the two models can then be displayed using a display device such as a monitor. The correlation of the 3D volume model and the 3D surface model of the same dental condition can be carried out by, for example, superimposition of anatomical structures within the two models, or also by markings in both models. Thus, the two models can already be correlated for carrying out this method.

The 3D surface model or subregions derived therefrom or additional regions derived therefrom using anatomical model knowledge, for example, are used at least partially as delimitation for the graphic representation of the 3D volume model, wherein the rest of the regions of the 3D volume model beyond the delimitation are hidden.

The anatomical model knowledge or an anatomical model data base contains, for example, the mean length of the tooth roots and the position of the tooth nerves of the individual teeth in relation to the size of the tooth concerned and to the tooth number according to the FDI World Dental Federation notation. Using a computer algorithm, the size and the tooth number of the respective teeth can thus be determined from the 3D surface model, wherein a mean length of the tooth roots and/or a relative position of the tooth nerves to the tooth in question is/are determined with the aid of anatomical model knowledge. For example, the boundary surface can be established perpendicular to the respective tooth axes of the individual teeth or parallel to an occlusal plane of the jaw concerned at a specified distance to the 3D surface model or to the occlusal plane in such a way that the tooth roots and the tooth nerves are arranged within the delimited volume of the graphic representation of the 3D volume model.

As an alternative to using an anatomical model data base, supplementary boundary surfaces can also be created by segmentation of an anatomical structure within the 3D volume model, such as a tooth root, a tooth nerve and/or a jawbone, wherein the surfaces of the segmented anatomical structure are defined as supplementary boundary surfaces. Accordingly, the inner volume is delimited by both the supplementary boundary surfaces and the 3D surface model.

This ensures that the tooth nerves and the tooth roots are also represented in the 3D volume model. The lateral boundary surfaces beyond the 3D surface model can be specified, for example, as extensions of the open edge of the 3D surface model parallel to the tooth axes or perpendicular to the direction of the occlusal plane of the jaw concerned. The boundary surfaces can be specified in a fully automated manner using a computer-supported algorithm.

For the specification of the boundary surfaces parallel to the occlusal plane of the jaw concerned, the distance to the occlusal plane can be established by multiplying the length of the tooth roots determined from the anatomical model knowledge by a safety factor of, for example, between 1.1-1.5.

The 3D surface model can comprise, for example, a portion of a lower jaw or upper jaw having several teeth and a gingiva. Hence a surface in the shape of a U-shaped channel is formed by such a 3D surface model so that the graphic representation of the 3D volume model can be delimited by only representing voxels of the 3D volume model that are arranged within the 3D surface model, in other words the U-shaped channel. The rest of the voxels of the 3D volume model can be hidden.

The 3D surface model can also be the surface of an individual tooth, wherein the representation of the 3D volume model, for example by x-ray CT data, is restricted solely to voxels within this tooth.

The 3D surface model can also be the surface of an individual tooth root that was segmented from the 3D volume model, for example.

The 3D surface model can also be an extrapolated expansion of the original surface model that takes anatomical model knowledge into account, e.g., an approximated model of the lower jaw arising from the recorded dental condition.

Hence the user can manually set the boundaries of the 3D surface model and/or select a 3D surface model such as the surface of a portion of the jaw, an individual tooth or an individual tooth root, wherein the representation of the 3D volume model is restricted solely to voxels situated within these 3D surface models.

An advantage of this method lies in the fact that only relevant regions that are situated within a region of the 3D surface model defined or selected by the user are displayed for the user. This considerably simplifies the construction of the dental component for the user.

The limitation to the relevant regions can be carried out in accordance with the application in question, such as a planning of an implant-borne tooth replacement part, a planning of a drilling template, or a planning of a full crown or partial crown. Depending upon the application in question, different relevant regions such as a surface of a gingiva, a tooth surface, a surrounding region of an implant, a jawbone, a root canal or a nerve canal are then displayed and the irrelevant regions are hidden.

For the construction of an implant-borne tooth replacement part such as a full crown or a bridge, for example, it is thus possible to display only a portion of the 3D surface model, i.e., the adjacent teeth, wherein a second subregion comprising, for example, the gingiva, can be rendered transparent so that the graphic representation of the delimited 3D volume model comprising the roots of the respective adjacent teeth is displayed. As a result, the relevant structures and/or regions are displayed for the user (such as a dentist) for the construction of an implant bore, an implant and the tooth replacement part to be inserted.

Advantageously, the delimitation of the 3D volume model can be set by a specified surface region of the 3D surface model, wherein the represented 3D volume model is limited to a volume region within the specified surface region, wherein the 3D volume model beyond the surface region is hidden.

Therefore, only voxels within the 3D surface model, such as those of a portion of the jaw, an individual tooth or a tooth root, are graphically represented. When defining a closed inner volume of the 3D surface model, the open sides are virtually closed by planes in such a way that, for example, a portion of a jaw in the shape of a U-shaped channel is closed on the three open sides at the edges of the U-shaped channel by three planes. The voxels beyond this defined inner volume are thus hidden. If the 3D surface model is an individual tooth, the inner volume of the 3D surface model is closed at the open end of the tooth by a virtual plane.

Advantageously, the delimitation of the 3D volume model can be set by a specified surface region of the 3D surface model and by computer-generated boundary surfaces, wherein the lateral boundary surfaces and the closing boundary surface are specified by defining at least one distance to the surface region in an at least one specified direction, wherein the represented 3D volume model is limited to an inner volume region within the specified surface region and within the boundary surfaces, wherein the 3D volume model beyond the inner volume region is hidden.

Because the lateral boundary surfaces extend the inner volume region to a specified distance to the surface region, anatomical structures, i.e., the tooth roots or tooth nerves, that go beyond the surface region of the 3D surface model are also represented within the inner volume region. For example, the specified distance can be set using an anatomical model data base, by estimating a mean length of the tooth roots and a relative position of the tooth nerves to the tooth in question in relation to the size and the tooth numbers of the teeth from the 3D surface model. A safety factor is added to the length of the tooth roots for determining the specified distance to the surface region.

Advantageously, the delimitation of the 3D volume model can be set by a specified surface region of the 3D surface model and by computer-generated boundary surfaces, which are created by segmentation of an anatomical structure within the 3D volume model.

Because the boundary surfaces created by segmentation extend the inner volume region, anatomical structures such as tooth roots or tooth nerves that go beyond the surface region of the 3D surface model are also represented within the inner volume region.

Advantageously, the 3D surface model can be divided by segmentation of anatomical structures into at least two surface regions, wherein the delimitation of the 3D volume model is set by at least one of the two surface regions.

As a result, the 3D surface model is divided into at least two surface regions, wherein at least one surface region is used for delimiting the graphic representation of the 3D volume model. It is thus possible to display only the 3D volume data within the teeth or within the gingival surface.

Advantageously, the anatomical structures can be teeth and a gingiva of at least a portion of a jaw so that the 3D surface model is divided into a first surface region of the teeth and a second surface region of the gingiva.

It is thus possible to display the essential structures of the 3D volume model within the visible surfaces of the teeth such as proximal surfaces of the molars, or within the visible surfaces of the gingiva such as the tooth roots and tooth nerves.

Advantageously, the 3D surface model can be divided into at least two surface regions, wherein at least one surface region is represented in a transparent or partially transparent fashion.

As a result, individual surface regions of the 3D surface model, such as the teeth or gingiva, can be hidden so that the underlying structures of the graphic representation of the 3D volume model can be discerned.

Advantageously, the entire 3D surface model can be represented in a transparent or partially transparent fashion.

As a result, the entire 3D volume model with the structures contained therein can be discerned in the graphic representation.

Advantageously, the specified surface region can be an individual segmented tooth within the 3D surface model, wherein the delimitation of the graphic representation of the 3D volume model is set by this segmented tooth.

Advantageously, the delimitation of the graphic representation of the 3D volume model can be set by a cut surface within the 3D surface model, wherein only the voxels of the 3D volume model that are arranged along the cut surface or adjacent thereto within a specified width perpendicular to the cut surface are represented, wherein the rest of the voxels of the 3D volume model are hidden.

The user can thus establish a cut surface within the 3D surface model such that only voxels of the 3D volume model that are situated in this cut surface or adjacent thereto are represented.

For example, the user can position a cut surface through a tooth and its roots in such a way that the only the voxels of the 3D volume model within this tooth and the tooth roots in this cut surface are displayed. This can simplify the diagnosis for an endodontic treatment, for example. The cut surface is thus delimited by the inner volume of the 3D surface model. If no voxels are arranged in the cut surface itself, image information for the graphic representation concerned can then be obtained by interpolating between two adjacent voxels. For example, the specified width can equal a voxel to the left and right, respectively, of the cut surface.

As an alternative, a three-dimensional representation of the cut surface can be produced by projecting the voxels of the 3D volume model perpendicular to the cut surface within a specified range in front of and behind the cut surface onto the cut surface so that the accumulated image information of these voxels is represented in the cut surface.

In a further alternative of the three-dimensional representation of the cut surface, an inner volume of the 3D volume model within a specified range in front of and/or behind the cut surface can be represented.

Advantageously, the graphic representation of the 3D volume model can be unrolled and represented in a flat plane in the manner of a panoramic tomographic image.

A graphic representation of the 3D volume model comprising, for example, CT image data or MRI image data rolled up in a flat plane is thus possible. If the 3D surface model is a lower jaw or upper jaw and the cut surface is arranged centered along the contour of the jaw in question, the convoluted cut surface along the jaw is rolled up and represented in a flat plane in the manner of a panoramic topographic image. In this manner, it is in particular possible to represent the interdental spaces in a single graphic representation of the 3D volume model.

Advantageously, the cut surface can be defined by a midline along the contour of a jaw.

As a result, the cut surface runs along a specified midline of the jaw in question. The cut surface can also run at an incline to the occlusal surfaces of the molars and in particular comprise the center axes of the tooth roots. In this manner, the cut surface contains both the inside of the individual teeth and the individual tooth roots. Such a graphic representation in particular enables the user to observe the interdental spaces and the inside of the tooth roots.

A further object of the invention is a data processing device comprising means for carrying out the method according to the invention. The data processing device can thus comprise a processor, which is integrated in, for example, a computer or smartphone.

BRIEF DESCRIPTION OF THE DRAWINGS

The invention is explained with reference to the drawings. The drawings show.

DETAILED DESCRIPTION OF THE INVENTION

Figure 1:
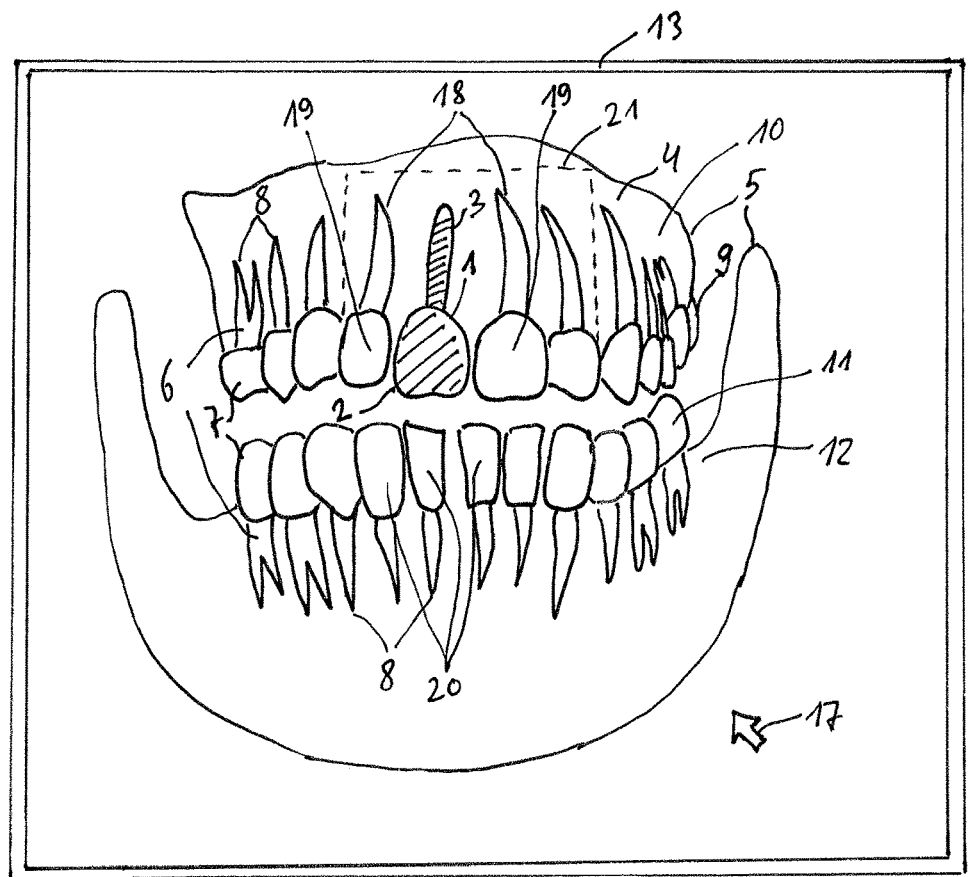
FIG. 1 a sketch for clarifying the construction of a dental component.

FIG. 1 shows a sketch for clarifying the construction of a dental component 1, namely an implant-borne full crown 2, represented in dashed lines, and an implant 3 for anchorage in a jawbone 4, wherein a graphic representation 5 of a dental condition is employed. The graphic representation 5 consists of a 3D volume model 6, which was created using an x-ray CT device or an MRI device, for example, and a 3D surface model 7, which was recorded using a dental camera for optical measurement, for example. The 3D volume model 6 and the 3D surface model 7 are correlated with each other and depicted together in the graphic representation. In addition to the jawbone, the 3D volume model 6 comprises other anatomical structures such as tooth roots 8, tooth nerves and blood vessels. The 3D surface model comprises the teeth 9 of an upper jaw 10 and the teeth 11 of a lower jaw 12. The 3D surface model furthermore comprises the not illustrated gingiva of the upper jaw 10 and of the lower jaw 12. The graphic representation 5 is depicted using a display device such as a monitor 13, wherein the display device is connected to a computer 14 in order to carry out the present computer-assisted method. Input means such as a keyboard 15 and a mouse 16 are connected to the computer in order to enable a user to navigate and manipulate the graphic representation 5 and to construct the dental component 1, using a cursor 17.

In the construction of the full crown 2 and the implant 3, the user, such as a dentist, in particular has to take the adjacent tooth roots 18, the adjacent teeth 19 and the opposite teeth 20 into account.

In the present case, the user has selected a surface region 21 of the 3D surface model 7, as indicated by the dashed line.

Figure 2:
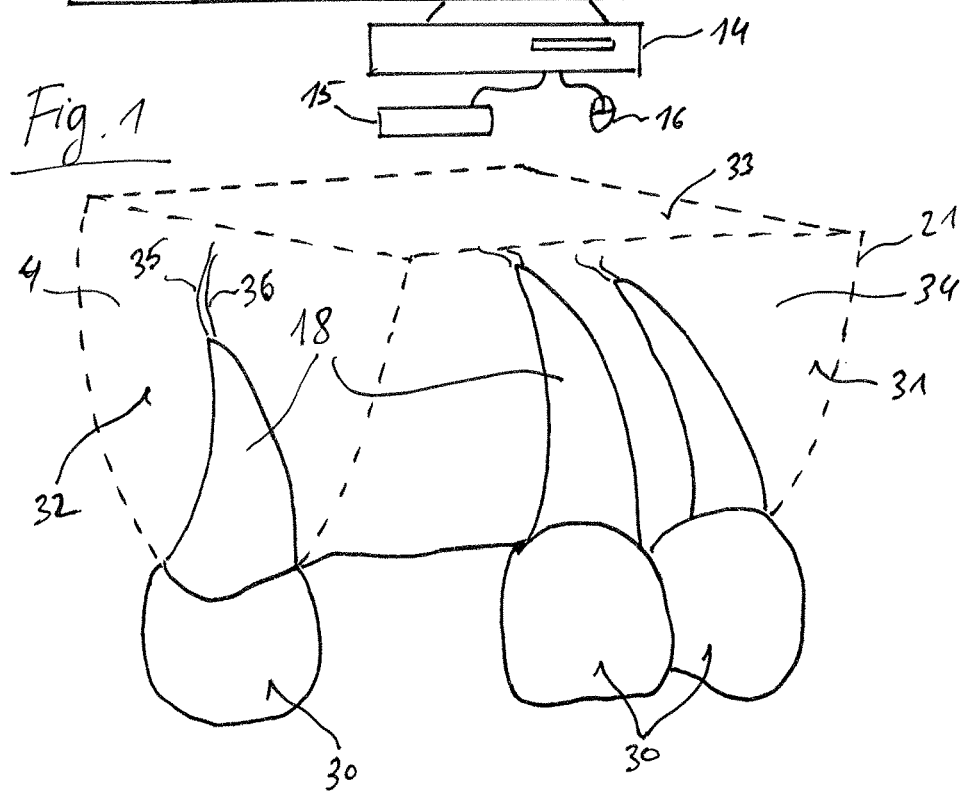
FIG. 2 a sketch of a selected surface region of the 3D surface model.

FIG. 2 shows a sketch of the selected surface region 21 of the 3D surface model 7 from FIG. 1, wherein the selected surface region 21 comprises a first surface region 30 of the teeth and a second convoluted, transparently represented surface region 31 of the gingiva. A first open side 32 of the left side of the cut-out surface region 21 in the shape of a U-shaped channel is virtually closed by a plane. In corresponding fashion, the second open side 33 and a third, not illustrated open side of the right side of the surface region 21 are virtually closed by planes. In this manner, an inner volume 34 is thus defined in the inside of the surface region 21. In particular, relevant anatomical structures such as the jawbone 4, the tooth roots 8, the tooth nerves 35 and the blood vessels 36 are arranged within this inner volume 34 of the selected surface region 21. In this manner, the graphic representation of the 3D volume model 6 is delimited by means of the selected surface region 21 of the 3D surface model 7. Only voxels of the 3D volume model 6 that are arranged within the inner volume 34 are displayed. The rest of the voxels of the 3D volume model 6 are hidden. In this manner, the user obtains a clear representation of the relevant regions for constructing the implant-borne full crown 2 from FIG. 1. During the construction, the user can in particular specify the diameter, the length, and the position and alignment of the implant 3 from FIG. 1 relative to the adjacent tooth roots 18 and the tooth nerves 35 and blood vessels 36. The user must furthermore specify the dimensions of the full crown from FIG. 1 in relation to the adjacent teeth 19 and the opposite teeth 20.

Figure 3:
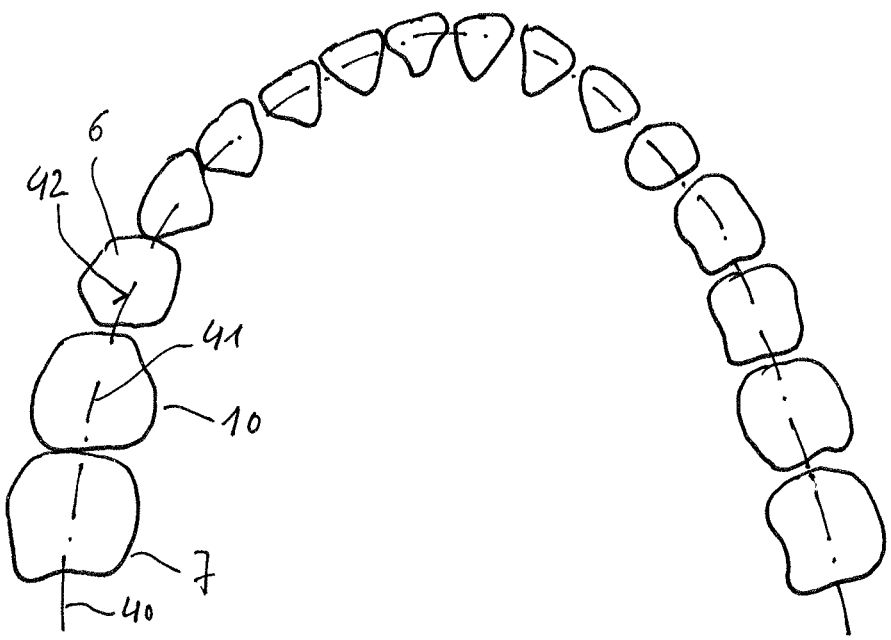
FIG. 3 a sketch of a 3D surface model of an upper jaw, viewed from above.

FIG. 3 shows a sketch of a 3D surface model 7 of an upper jaw 10 in a view from above, wherein a midline 40 or rather a jaw line, represented as a dotted line, runs centered along the contour of the upper jaw 10. A cut surface 41, which for example can run perpendicular to an occlusal plane of the upper jaw or also in the direction of the tooth roots, runs through this midline 40. The cut surface 41 thus runs within the inner volume 34 of the 3D surface model 7. The 3D surface model 7 is thus closed and virtually filled in by plane surfaces, as illustrated in FIG. 2. Hence only a layer with a width of at least one voxel is depicted along the cut surface 41 for delimiting the graphic representation of the 3D volume model 6 within the inner volume 34 of the 3D surface model 7. The rest of the voxels of the 3D volume model 6 are hidden. As a result, only one layer of the 3D volume model 6 is depicted on the specified cut surface 41. In particular, the user is thus able to obtain a better representation of the inside of the teeth and of the tooth roots.

Figure 4:
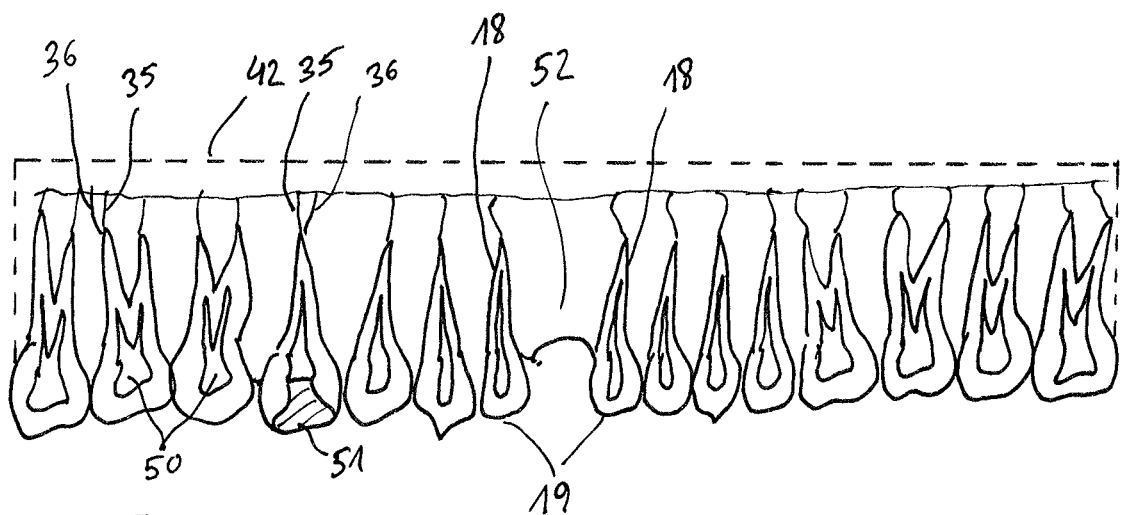
FIG. 4 a sketch of a graphic representation of a 3D volume model.

FIG. 4 shows a sketch of a graphic representation of the 3D volume model 6, namely the represented layer from FIG. 3, but which has been rolled up and is displayed in a plane surface in the manner of a panoramic tomographic image. In the represented layer 42 of the 3D volume model, anatomical structures inside the teeth such as a pulp 50, nerves 35 and blood vessels 36 are represented in particular. A filling 51 (represented in dashed lines) can also be discerned in the representation of the layer 42. This enables a clear sectional view through the adjacent teeth 19 and the adjacent tooth roots 18 in an implant region 52 of the implant-borne crown 2 from FIG. 1 that is to be inserted.

Figure 5:
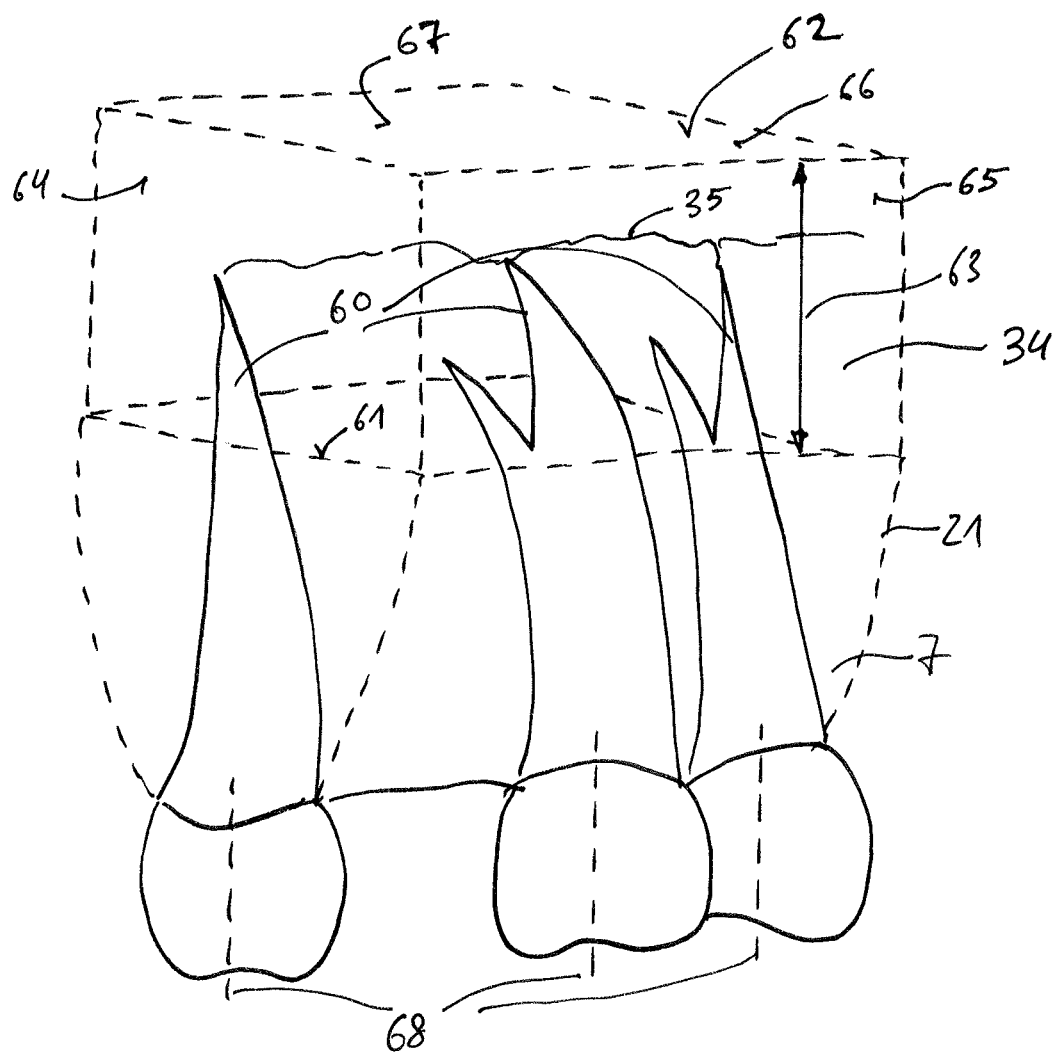
FIG. 5 a sketch of a selected surface region of the 3D surface model with additional boundary surfaces, FIG. 6 a sketch of the selected surface region of the 3D surface model.

FIG. 5 shows a sketch of the selected surface region 21 of the 3D surface model 7 as in FIG. 3, wherein in contrast the tooth roots 60 extend past an edge 61 of the selected surface region 21. A delimiting boundary surface 62 is thus arranged at a distance 63 to the edge 61 such that the tooth roots 60 and tooth nerves 35 are represented within the inner volume 34. The inner volume 34 is therefore delimited by the selected surface region 21 of the 3D surface model 7 and by the upper boundary surface 62 and lateral boundary surfaces 64, 65, 66, 67. The lateral boundary surfaces 64, 65, 66, 67 are specified by shifting the edge 61 in a direction parallel to the tooth axes 68 or perpendicular to an occlusal plane up to the distance 63.

Figure 6:
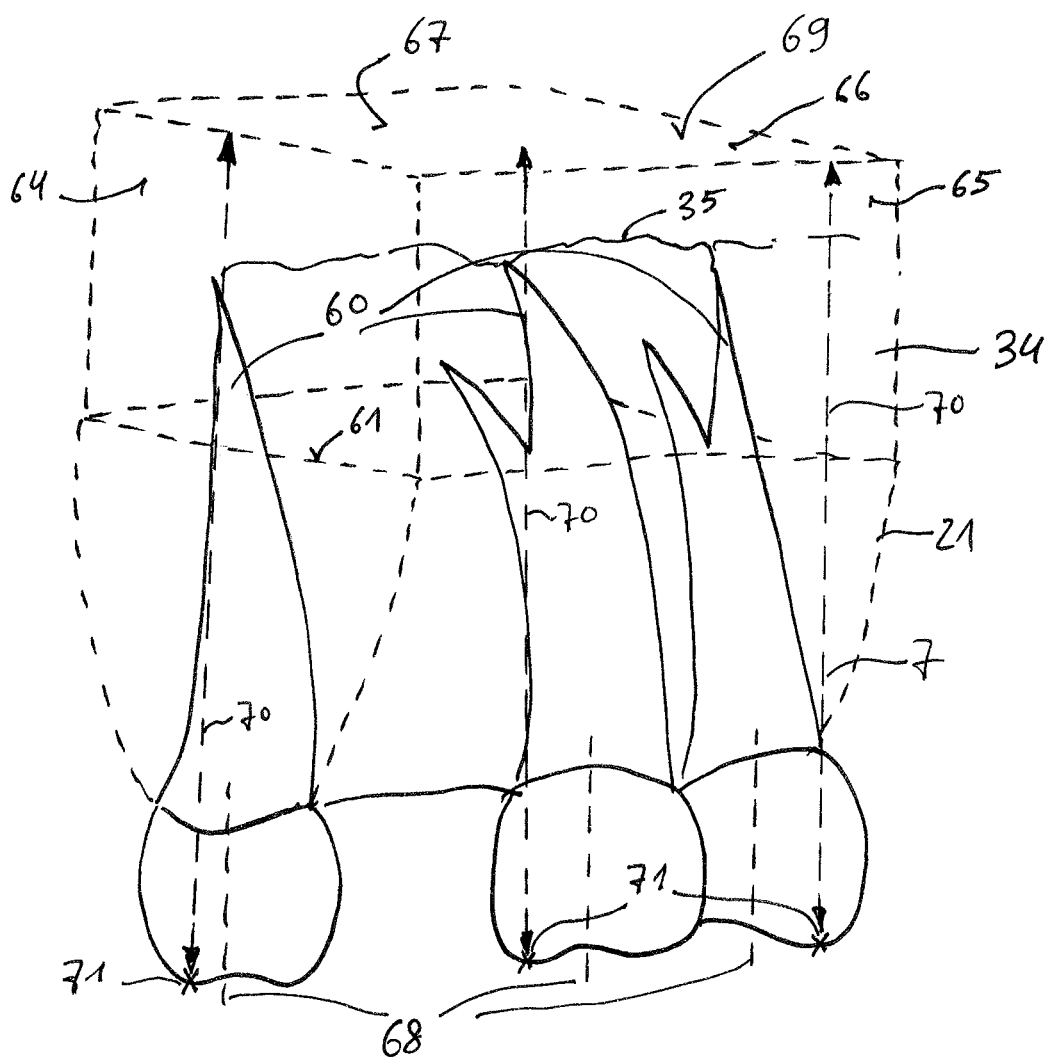

FIG. 6 shows a sketch of the selected surface region 21 of the 3D surface model 7 as in FIG. 5. A delimiting boundary surface 69 is arranged at distances 70 to tooth surface points 71 such that the tooth roots 60 and tooth nerves 35 are represented within the inner volume 34. The inner volume 34 is therefore delimited by the selected surface region 21 of the 3D surface model 7 and by the upper boundary surface 69 and lateral boundary surfaces 64, 65, 66, 67. The lateral boundary surfaces 64, 65, 66, 67 are specified by shifting the edge 61 in a direction parallel to the tooth axes 68 or perpendicular to an occlusal plane up to the upper boundary surface 69.

REFERENCE SIGNS

1 Dental component
2 Implant-borne full crown
3 Implant
4 Jawbone
5 Graphic representation
6 3D volume model
7 3D surface model
8 Tooth roots
9 Teeth
10 Upper jaw
11 Teeth
12 Lower jaw
13 Monitor
14 Computer
15 Keyboard
16 Mouse
17 Cursor
18 Tooth root
19 Adjacent teeth
20 Opposite teeth
21 Surface region
30 First surface region of the teeth
31 Second transparent surface region of a gingiva
32 First open side 33 Second open side
34 Inner volume
35 Tooth nerves
36 Blood vessels
40 Midline
41 Cut surface
42 Represented layer
50 Pulp
51 Filling
52 Implant zone
60 Tooth roots
61 Edge
62 Boundary surface
63 Distance
64 Boundary surface
65 Boundary surface
66 Boundary surface
67 Boundary surface
68 Tooth axes
69 Boundary surface
70 distances
71 tooth surface points

The invention claimed is:

1. A method for creating a graphic representation of a dental condition, comprising:
 correlating a 3D volume model of the dental condition with a 3D surface model of the dental condition,
 restricting the graphic representation of the 3D volume model to relevant regions by delimiting the graphic representation of the 3D volume model by:
 specifying a surface region of the 3D surface model that contains a defined position for a dental component and one or more teeth adjacent to the defined position, the specifying is performed to generate a U-shaped channel that is formed by the 3D surface model so that the graphic representation is delimited by U-shaped channel;
 segmenting an anatomical structure within the 3D volume model, the anatomical structure comprises a relevant tooth root and tooth nerve;
 computing an edge of the surface region, the edge is parallel to an occlusal plane, and the anatomical structure extends past the edge;
 arranging a delimiting boundary surface at a distance from the edge in a direction away from the surface region, and automatically generating boundary surfaces such that the arranging causes an inner volume within the specified surface region to be extended a specified distance away from the specified surface region such that the anatomical structure is represented within the extended inner volume;
 selectively hiding the remaining regions of the 3D volume, based on the specified surface region and the computer generated boundary surfaces, to aid in subsequent construction of a tooth replacement part,
 wherein the 3D surface model is divided by segmentation of the anatomical structure into at least two surface regions, wherein delimitation of the 3D volume model is further based on at least one of the at least two surface regions,
 wherein the anatomical structure further comprises one or more teeth and a gingiva of at least a portion of a jaw such that the 3D surface model is divided into a first surface region of the teeth and a second surface region of the gingiva.

2. The method according to claim 1, wherein the 3D surface model is divided into at least two surface regions, wherein at least one surface region is represented as transparent or partially transparent.

3. The method according to claim 1, wherein an entirety of the 3D surface model is represented as transparent or partially transparent.

4. The method according to claim 1, wherein the specified surface region is a single segmented tooth within the 3D surface model, wherein the graphic representation of the 3D volume model is delimited by the single segmented tooth.

5. A computer usable program product comprising one or more computer-readable storage devices, and program instructions stored on at least one of the one or more computer-readable storage devices, the stored program instructions executable by a processor and comprising program instructions to carry out the method according to claim 1.

6. A non-transitory computer-readable storage medium storing a program which, when executed by a computer system, causes the computer system to perform a procedure comprising method according to claim 1.

* * * * *